US009986242B2

United States Patent
Wei

(10) Patent No.: US 9,986,242 B2
(45) Date of Patent: May 29, 2018

(54) ENHANCED IMAGE ENCODING IN A VIRTUAL DESKTOP INFRASTRUCTURE ENVIRONMENT

(71) Applicant: VMware, Inc., Palo Alto, CA (US)

(72) Inventor: Yuping Wei, Beijing (CN)

(73) Assignee: VMWARE, INC., Palo Alto, CA (US)

( * ) Notice: Subject to any disclaimer, the term of this patent is extended or adjusted under 35 U.S.C. 154(b) by 353 days.

(21) Appl. No.: 14/165,879

(22) Filed: Jan. 28, 2014

(65) Prior Publication Data

US 2015/0215624 A1    Jul. 30, 2015

(51) Int. Cl.
| | |
|---|---|
| *G06F 3/00* | (2006.01) |
| *H04N 19/136* | (2014.01) |
| *H04L 12/24* | (2006.01) |
| *G06F 3/0481* | (2013.01) |
| *G06F 3/048* | (2013.01) |
| *H04N 19/58* | (2014.01) |
| *H04L 29/08* | (2006.01) |

(52) U.S. Cl.
CPC .......... *H04N 19/136* (2014.11); *G06F 3/048* (2013.01); *G06F 3/0481* (2013.01); *H04L 41/22* (2013.01); *H04N 19/58* (2014.11); *H04L 67/1002* (2013.01)

(58) Field of Classification Search
CPC .......... G06F 1/163; G06F 3/011; G06F 3/016; G06F 21/00; H04L 67/025
USPC .......................................................... 715/740
See application file for complete search history.

(56) References Cited

U.S. PATENT DOCUMENTS

| | | | | |
|---|---|---|---|---|
| 2003/0067489 | A1* | 4/2003 | Candy Wong | .......... H04L 67/36 715/765 |
| 2006/0200253 | A1* | 9/2006 | Hoffberg | ................ G05B 15/02 700/19 |
| 2010/0269047 | A1* | 10/2010 | Pahlavan | ............... G06F 9/4445 715/740 |
| 2011/0199389 | A1* | 8/2011 | Lu | ........................... G06F 3/017 345/619 |
| 2013/0290856 | A1 | 10/2013 | Beveridge et al. | |

OTHER PUBLICATIONS

Pat Lee, "Introducing Unity Touch for iOS and Android", VMware End-User Computing Blog, Mar. 15, 2013, Retrieved from the Internet at < URL: http://blogs.vmware.com/euc/2013/03/introducing-unity-touch.html > on Jan. 28, 2014.

* cited by examiner

*Primary Examiner* — Joy M Weber
(74) *Attorney, Agent, or Firm* — SU IP Consulting

(57) ABSTRACT

A method is provided to perform enhanced image encoding in a virtual desktop infrastructure (VDI) environment that includes a client device having a first graphical user interface (GUI) and a server device having a second GUI associated with the first GUI. One example method may include receiving, from the client device, user interface (UI) events based on which the first GUI is to be updated, and obtaining, by an agent on the server device, UI information relating to a UI element on the second GUI. The method may further include determining, by the agent on the server device, an encoding configuration for an encoder based at least in part on the UI information, encoding image data of the second GUI based on the encoding configuration, and sending encoded image data to the client device to update the first GUI on a screen of the client device.

17 Claims, 8 Drawing Sheets

ENHANCED IMAGE ENCODING IN A VIRTUAL DESKTOP INFRASTRUCTURE ENVIRONMENT

BACKGROUND

Unless otherwise indicated herein, the approaches described in this section are not admitted to be prior art by inclusion in this section.

Server-based computing allows a remote client device to access computing resources on the server. For example, the client device may run suitable remote desktop client software and hardware that uses a remote desktop protocol to access a desktop remotely, such as Remote Desktop Protocol (RDP), Virtual Network Computing (VNC) and Personal Computer over Internet Protocol (PCoIP), etc.

The remote desktop client software displays an image of a graphical user interface (GUI) generated by the operating system and applications running at the server computing system. The remote desktop is accessible by the user using the remote desktop protocol and a desktop remoting client. The client device transmits user input such as keyboard or mouse input to the remote system to be processed there, and receives display and other data, such as sound, for presentation to the user.

Virtual Desktop Infrastructure (VDI) is used to create a large number of independent computing environments for a large number of users using computer virtualization technologies. Users remotely access the virtual machines running in the server using software that remotes the user interface of the remote desktop. Users can login to the virtual desktop anytime from any device supporting a remote protocol to connect to the virtual desktop. A user may be accessing the remote desktop via client devices, such as smart phones, tablet devices, cellular phones, desktop computers, laptop computers, etc.

DETAILED DESCRIPTION

Figure 1:
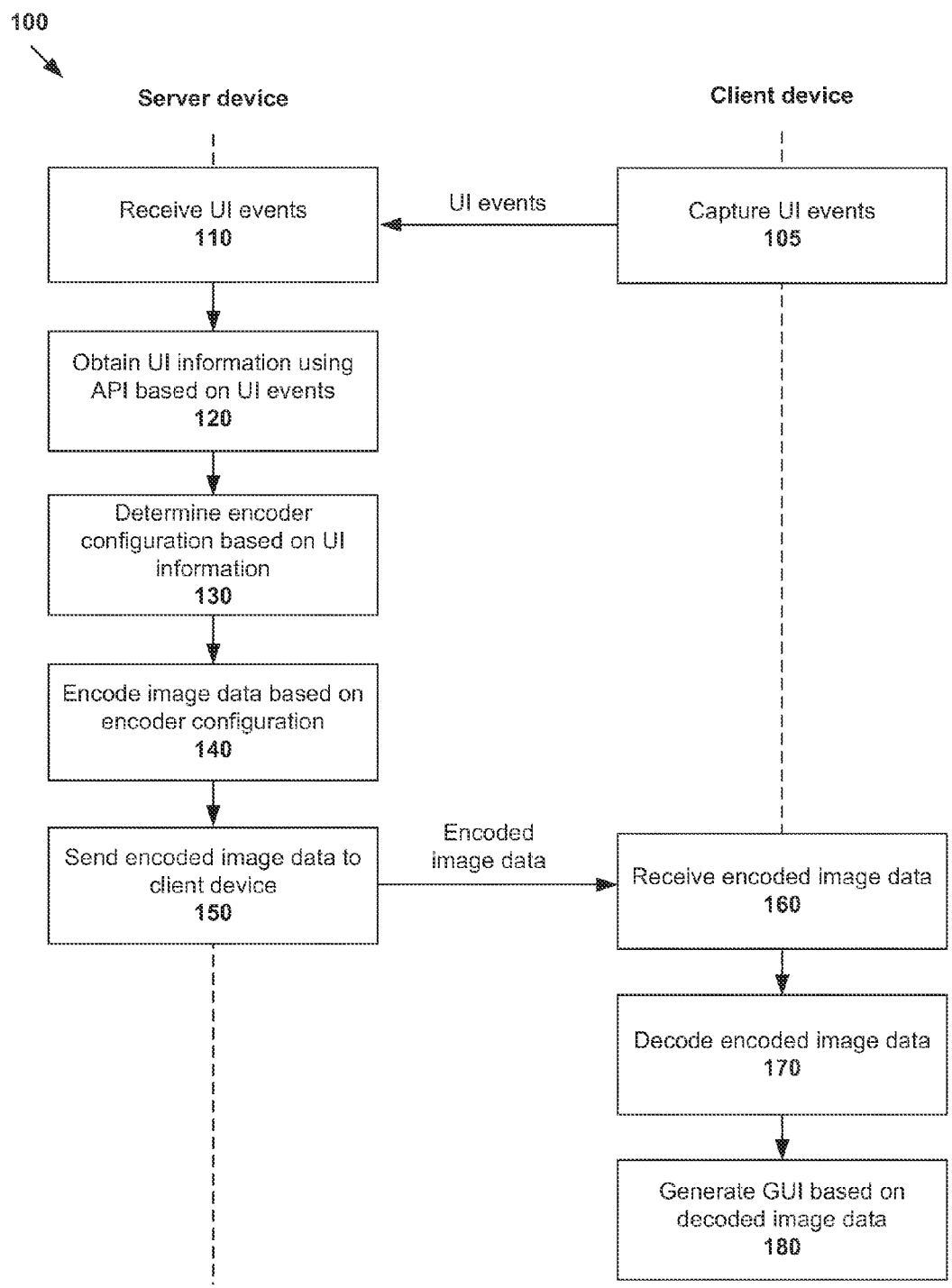
FIG. 1 is a flowchart of a process for enhanced image encoding in a VDI environment, in accordance with at least some embodiments of the present disclosure.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the drawings, can be arranged, substituted, combined, and designed in a wide variety of different configurations, all of which are explicitly contemplated herein.

FIG. 1 is a flowchart of process 100 for enhanced image encoding in a VDI environment, in accordance with at least some embodiments of the present disclosure. The VDI environment includes a client device that supports a first GUI and a server device that supports a second GUI. Process 100 may include one or more operations, functions, or actions illustrated by one or more blocks, such as blocks 105 to 180. The various blocks may be combined into fewer blocks, divided into additional blocks, and/or eliminated based upon the desired implementation.

Referring to the server device of FIG. 1: at block 110, the server device receives user interface (UI) events based on which the first GUI at the client device is to be updated. At block 120, an agent on the server device obtains UI information relating to a UI element on the second GUI. The UI information is obtained by the agent from the operating system (OS) on the server device by using an application programming interface (API), supported by the OS on the server device. The UI information may include updates to the second GUI which are caused by the UI events received from the client device. Alternatively or additionally, the UI information may contain updates to the second GUI which are caused by other events, such as local events caused by applications running on the server. At block 130, the agent on the server device determines an encoding configuration for a framebuffer encoder, supported by the server device, based on the UI information. At block 140, the framebuffer encoder encodes image data of the second GUI based on the encoding configuration. At block 150, server device sends encoded image data to the client device, so that the first GUI on a screen of the client device may be updated.

Referring to the client device of FIG. 1: at block 105, the client device captures and sends, to the server device, UI events based on which the first GUI is to be updated. At block 160, the client device receives encoded image data, which is encoded based on UI information obtained by server device based on the UI events, from the server device. At blocks 170 and 180, the client device decodes the encoded image data and generates the first GUI based on decoded image data.

In accordance with at least some embodiments of the present disclosure, the UI information generated by the server device using an API is used to enhance image encoding. This improves the efficiency of the encoding process, compared to approaches that use complex image processing algorithms to derive the same information. Computing resources at the server device may then be utilized more efficiently, allowing more client devices to be supported.

Further, in accordance with at least some embodiments of the present disclosure, process 100 may be implemented in a VDI environment that supports seamless window application, in which software applications provided by the server device may appear to operate natively on the first GUI of client device. For example, when a user opens a document via their remote desktop, a native document processing application is invoked at the client device to open the document.

Throughout the present disclosure, the term "encoding configuration" may generally refer to information or encoding result used by the framebuffer encoder to generate encoded image data, such as motion vector (e.g. motion vector for motion compensation), encoding mode (e.g. text-based, intra-frame encoding mode and inter-frame encoding mode), reference frame information (e.g. short-term reference frame and long term reference frame) etc.

The term "UI events" may generally refer to any information that may trigger an update of the first GUI. For example, the UI events may include UI input events associated with a user's interaction with the first GUI, such as selection, activation, update, state change of a UI element on the first GUI, etc. The UI input events may be captured by the client device using any suitable input device, such as a keyboard to capture keyboard events (e.g. key(s) pressed), mouse to capture mouse events (e.g. cursor position, key(s) pressed) and touch screen to capture touch screen input events (e.g. position(s) touched), etc. Multiple input devices may be used simultaneously to capture different types of events. Besides UI input events, there may be other sources that trigger a screen update of the first GUI.

The term "UI information" may generally refer to information or metadata relating to a UI element on the second GUI supported by the server device. Examples of UI information include the UI element's attributes, such as identifier (ID), type, position, size, color (e.g. background color, foreground color, etc.), sub-elements (e.g. text box within a window), font type, text, title, state, shape, etc. Examples of UI elements include windows, buttons, menus, text boxes, lists, application icons, menu bars, scroll bars, title bars, status bars, size grips, toolbars, dropdown lists, etc.

The UI information may be obtained by the agent on the server device based on the UI events from the client device. For example, when a window is moved on the first GUI, UI input events (e.g. a series of key pressed, cursor moved, key released etc.) relating to the movement are captured by the client device and sent to the server device. Based on the UI events, the server device obtains UI information (e.g. window ID and new position) from the OS supported on the server device using an API. Alternatively or additionally, the UI information may also be obtained based on these other sources or events, such as when a screen saver appears after some time has passed, etc.

VDI Environment

Figure 2:
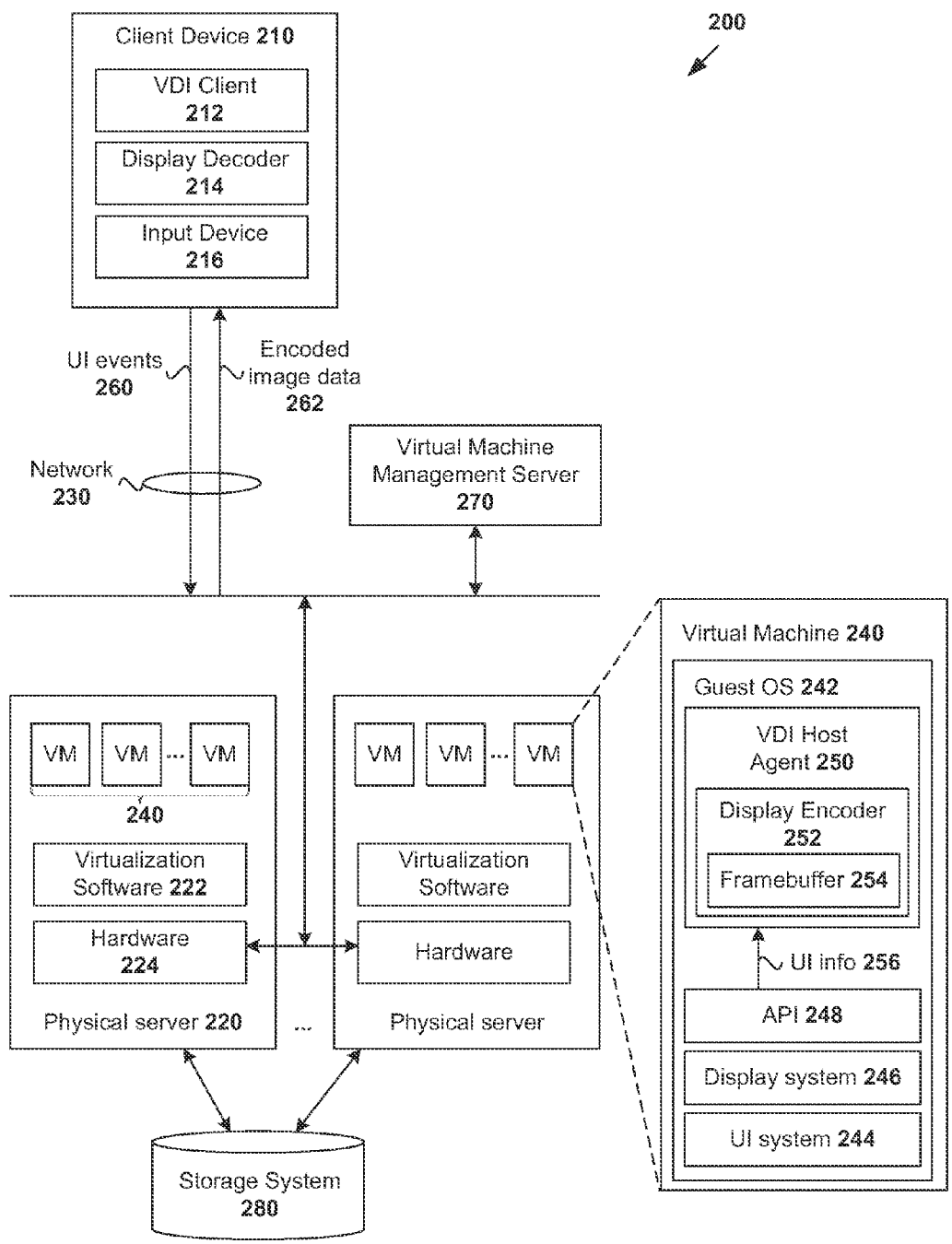
FIG. 2 is a schematic diagram of an example VDI environment in which enhanced image encoding may be implemented, in accordance with at least some embodiments of the present disclosure.

FIG. 2 is a schematic diagram of an example VDI environment 200 in which enhanced image encoding may be implemented, in accordance with at least some embodiments of the present disclosure. VDI environment 200 includes client devices 210 (one shown for simplicity) in communication with physical servers 220 (also referred to as "server device") over network 230. Although a single network 230 is shown for simplicity, components in VDI environment 200 may be connected over the same or different networks. Further, it should be understood that VDI environment 200 may include additional or alternative components, and may have a different configuration.

Client device 210 runs VDI client software 212 ("VDI client") to provide a GUI for users to access their desktops running on physical servers 220. Client device 210 further includes display decoder 214 to decode encoded image data 262 and input device 216 to capture UI events 260, including UI input events and/or any other events based on which the local desktop at client device 210 is to be updated. With VDI clients 212, users can access remote desktops (i.e. remote to client device 210) running on physical servers 220 from any location via network 230.

In the present disclosure, the term "desktop" may generally refer to the instance of an interactive operating environment provided by a computer operating system and software applications, such as in the form of a display, sound output and user input. Also, "remote desktop" (i.e. remote to client device 210, also "second GUI") refer to the desktop running on physical server 220 and accessible by client device 210 via network 230, while "local desktop" (i.e. local to client device 210, also "first GUI") refers to an instance of the "remote desktop" at client device 210.

Physical servers 220 each execute virtualization software 222 and include hardware 224 that support multiple virtual machines 240. Physical servers 220 may be controlled by virtual machine management server 270 and access a shared persistent storage system 280. Each virtual machine 240 may run a remote desktop accessible by client device 210. In greater detail, virtual machine 240 implements guest operating system (OS) 242 to support various applications, such as VDI host agent 250 to interact with VDI client 212 at client device 210, as well as UI system 244, display system 246 and Application Programming Interface (API) 248. Although not shown in FIG. 2, VDI client 212 may further execute a user interface virtualization (UIV) client configured to communicate with a corresponding UIV agent running on VDI host agent 250.

VDI host agent 250 generally provides a suite of applications, including a framebuffer encoder, such as display encoder 252, to encode image data in framebuffer 254 etc. Encoded image data 262 received by client device 210 is decoded using display decoder 214 at client device 210. The term "framebuffer" may generally refer to un-encoded image data in memory, which in some embodiments, may represent the image data that may be displayed on the remote desktop. Framebuffer 254 may be in any suitable format, such as RGB bitmap format. Further, any suitable encoding technique may be used by display encoder 252, such as H.264/Advanced Video Coding (AVC), Personal Computer over Internet Protocol (PCoIP) and Portable Network Graphics (PNG), etc.

VDI host agent 250 invokes API 248 supported on guest OS 242 to obtain UI information 256. API 248, which may be referred to as "accessibility API" or "interface interaction API", is able to obtain metadata relating to a UI element on the remote desktop. For example, API 248 may be an API that is used by assistive technologies to make an application running on guest OS 240 or the guest OS 240 itself more accessible to persons with vision, hearing or motion impairments. Examples include Microsoft Accessibility API and Microsoft UI Automation API, etc. For example, UI information 256 that may be obtained using Microsoft Accessibility API include a window's ID (e.g. ID=1100), screen position (e.g. (X=20, Y=30)), state (e.g. pressed, focused, etc.) and sub-elements (e.g. text box within window), etc.

Encoding Configuration

Referring to FIG. 1 again, server device 220 receives UI events 260 from client device 210, obtains UI information 256 using API 248 and determines an encoding configuration for framebuffer encoder 254 based on UI information 256. Some examples of encoding configuration will be discussed with reference to FIG. 3 and corresponding FIG.

4, FIG. 5 and FIG. 6 below. The examples may be implemented independent of each other.

Figure 3:
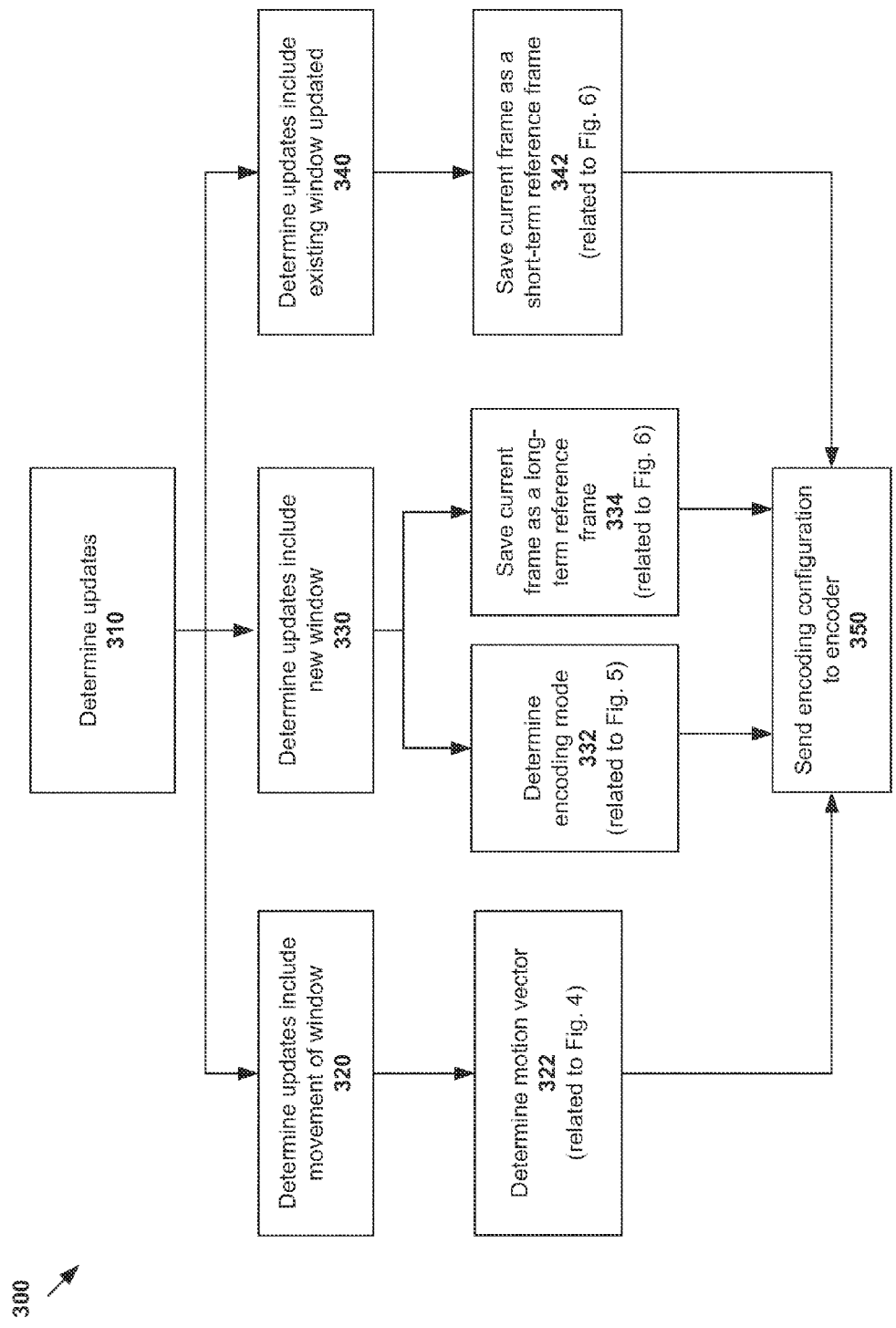
FIG. 3 is a flowchart of a process for determining an encoding configuration, in accordance with at least some embodiments of the present disclosure.

FIG. 3 is a flowchart of a process 300 for determining an encoding configuration based on UI information 256, in accordance with at least some embodiments of the present disclosure. It will be appreciated that process 300 may include one or more operations, functions, or actions illustrated by one or more blocks, such as blocks 310 to 350. Although various blocks are illustrated in sequential orders, these blocks may also be performed in parallel, and/or in a different order than those described herein. Also, various blocks may be combined into fewer blocks, divided into additional blocks, and/or eliminated based upon the desired implementation.

At block 310 in FIG. 3, prior to encoding a new frame, server device 220 determines updates to the remote desktop or second GUI. For example, server device 220 compares a current frame with a previous frame of the remote desktop to determine a frame change, or any changes between the current frame and the previous frame. For example, framebuffer 254 may further include a current framebuffer representing the current frame and a previous framebuffer representing the previous frame. VDI host agent 250 may retrieve the current frame and the previous frame from framebuffer 254 and compare the data of the two frames to determine the frame change.

Figure 5:
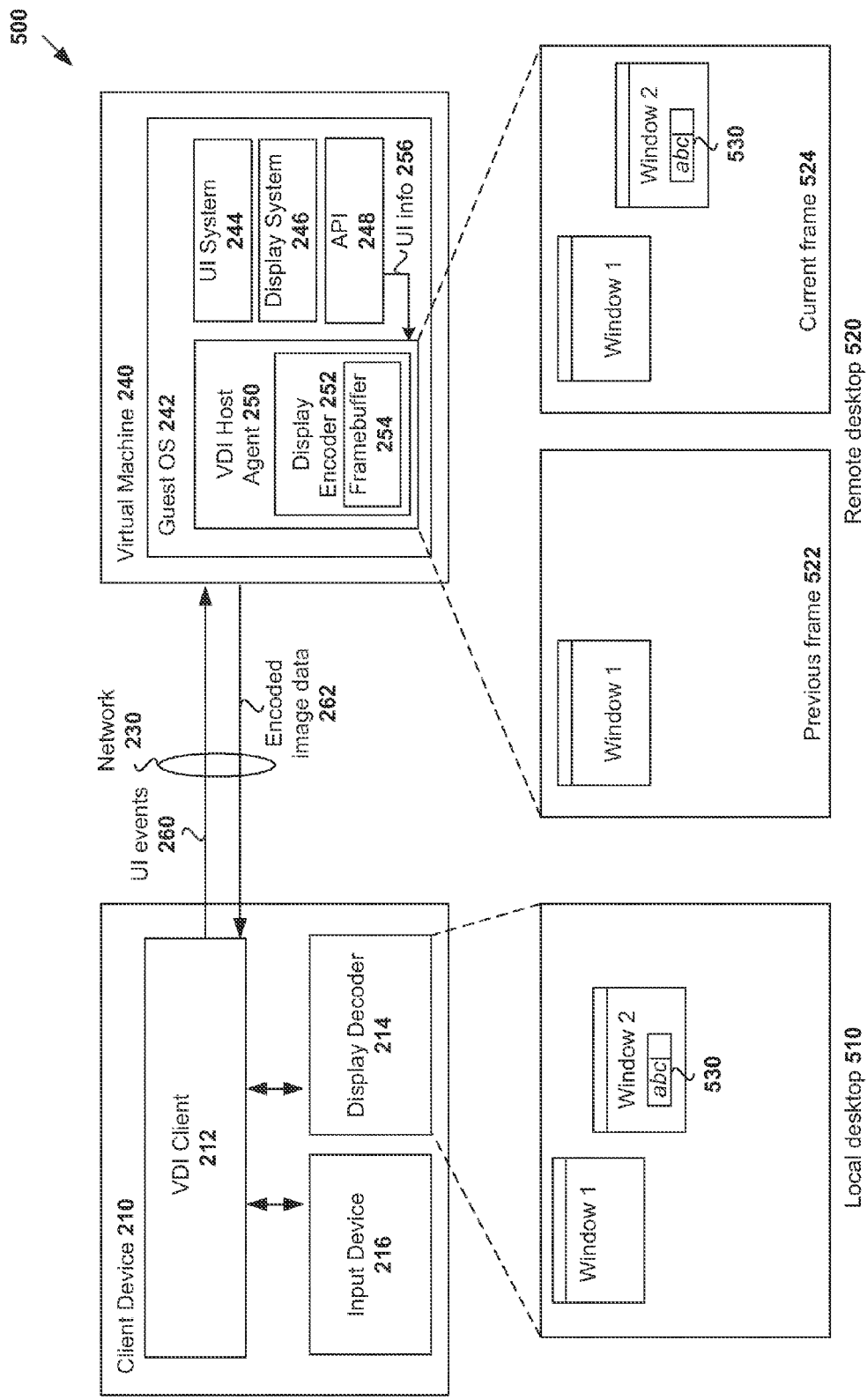
FIG. 5 is a schematic diagram of an example VDI environment in which UI information is used to determine an encoding mode, in accordance with at least some embodiments of the present disclosure.
Figure 6:
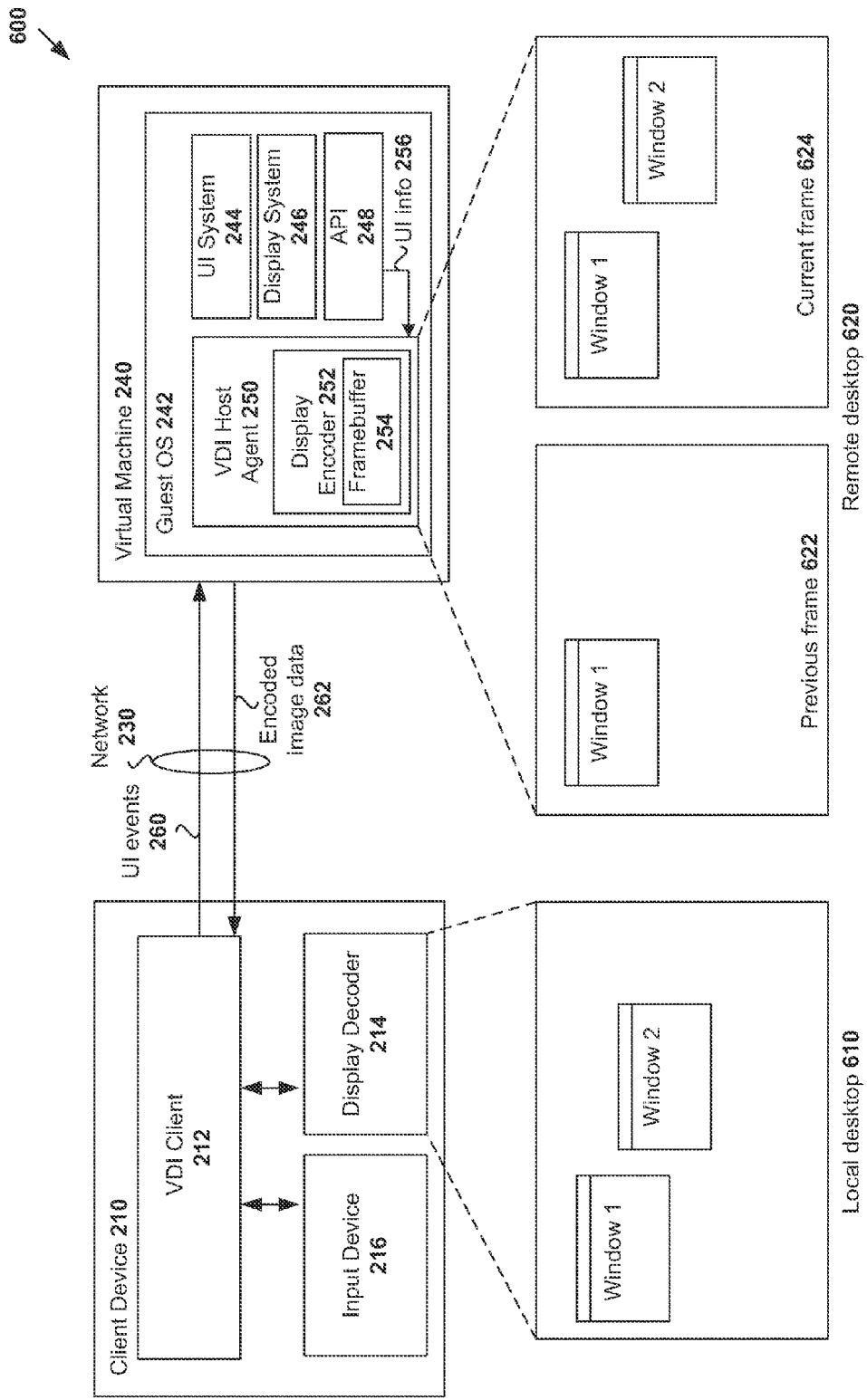
FIG. 6 is a schematic diagram of an example VDI environment in which UI information is used to determine a reference frame, in accordance with at least some embodiments of the present disclosure.

Server device 220 then determines the encoding configuration based on UI information 256, such as motion vector (see blocks 320, 322 in FIG. 3 and FIG. 4), encoding mode (see blocks 330, 332 in FIG. 3 and FIG. 5) and reference information (blocks 340, 342 in FIG. 3 and FIG. 6). The encoding configuration is then sent to display encoder 252 to encode image data 262 for client device 210 (see block 350 in FIG. 3).

Motion Vector

Figure 4:
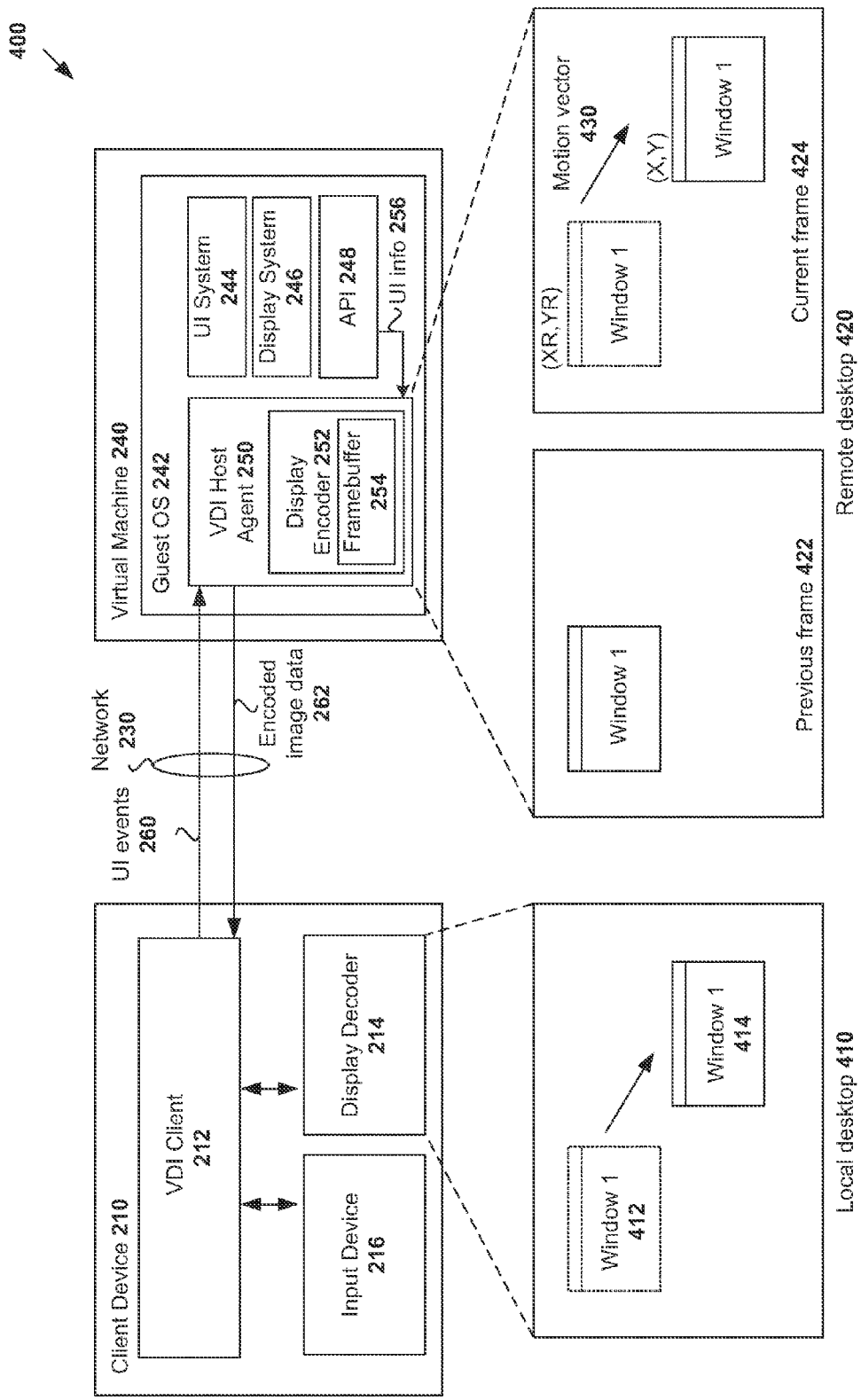
FIG. 4 is a schematic diagram of an example VDI environment in which user interface (UI) information is used to determine a motion vector, in accordance with at least some embodiments of the present disclosure.

FIG. 4 is a schematic diagram of an example VDI environment 400 in which UI information 256 is used to determine a motion vector, in accordance with at least some embodiments of the present disclosure. The example in FIG. 4 is related to blocks 320 and 322 in FIG. 3 and may be used when display encoder 252 uses a motion-compensation-based encoding technique, such as H.264/AVC etc.

Motion compensation generally describes a user interface in terms of the transformation of a previous frame to a current frame. In block-oriented motion compensation, frames are partitioned into blocks (e.g. macroblocks of 16×16 pixels, etc.), and each block is predicted from a corresponding block in a reference frame. A motion vector represents transformation of a block from the reference frame to the current frame.

In FIG. 4, local desktop 410 represents the first GUI at client device 210, while remote desktop 420 represents the second GUI at server device 220. In this example, Window 1 on local desktop 410 is moved from first position 412 to second position 414. VDI client 212 at client device 210 captures UI events 260 that include a series of mouse input events that cause movement of Window 1. VDI host agent 250 then obtains UI information 256 relating to the window movement using API 248, such as new position, ID and size of Window 1 etc.

In more detail, VDI host agent 250 at virtual machine 240 determines a frame change (or a changed area in the frame) by comparing previous frame 422 with current frame 424 stored in framebuffer 254. For each block in the changed area, VDI host agent 250 determines a window ID associated with the block based on the position and size of Window 1. Since Window 1 moves from first position (XR,YR) in reference/previous frame 422 to second position (X,Y) in current frame 424, VDI host agent 250 determines motion vector 430 for a block belonging to Window 1 as (XR−X,YR−Y). VDI host agent 250 then provides motion vector 430 to display encoder 252 to encode current frame 424.

Although a single window (i.e. Window 1) is shown in FIG. 4 for simplicity, it should be understood that there may be multiple windows, in which case VDI host agent 250 determines a motion vector for each window that has been moved. Similarly, the current frame may be analyzed to determine motion vector 430 for each block associated with each moved window. The above may also be used when the frame change includes movement of a page on an existing window, such as due to scrolling.

Encoding Mode

FIG. 5 is a schematic diagram of an example VDI environment 500 in which UI information 256 is used to determine an encoding mode, in accordance with at least some embodiments of the present disclosure. The example in FIG. 5 is related to blocks 330 and 332 in FIG. 3 and may be used when display encoder 252 uses an encoding technique that adaptively selects an encoding mode depending on the image data.

For example, PCoIP provides different codecs to encode video images and text to improve encoding efficiency. In FIG. 5, local desktop 510 represents the first GUI at client device 210, while remote desktop 520 represents the second GUI at server device 220. Local desktop 510 includes Window 1 that remains unchanged, while new Window 2 with UI element 530 is changed. Since UI element 530 is a text box in this case, and text boxes usually only have one foreground color and one background color, it is not suitable to encode the image data associated with the text box using techniques such as Discrete Cosine Transform (DCT) and wavelet because the text box may contain too many high frequency components. The same applies to other text-based UI elements such as a text document, etc.

VDI client 212 at client device 210 captures UI events 260 that cause the creation of Window 2, such as UI input events relating to a user clicking an icon of an application or document. VDI host agent 250 obtains UI information 256 associated with the creation of Window 2 using API 248, such as position and size of new Window 2, and size and position of text box 530, to VDI host agent 250. VDI host agent 250 uses UI information 256 to determine encoding configuration for display encoder 252. For example, according to blocks 310 to 330 in FIG. 3, VDI host agent 250 compares current frame 524 with previous frame 522, such as using block-oriented comparison. Since Window 2 in current frame 524 does not exist in previous frame 522, VDI host agent 250 also checks whether Window 2 has other any other UI element and its position and size. In this case, according to block 332 in FIG. 3, VDI host agent 250 selects a text encoding mode for each block associated with text box 530, and an intra-frame encoding mode for each block associated with new Window 2.

Alternatively or additionally, VDI host agent 250 may select an intra-frame encoding mode or inter-frame encoding mode for encoder 252. For example, when the frame change includes the creation of a new UI element (e.g. window), intra-frame encoding mode may be selected. When the frame change includes the update of an existing UI element (e.g. window), inter-frame encoding mode may be selected. Other suitable encoding mode may also be used.

Reference Frame Information

FIG. 6 is a schematic diagram of an example VDI environment 600 in which UI information 256 is used to determine reference frame information, in accordance with at least some embodiments of the present disclosure. The example in FIG. 6 is related to blocks 330 and 334 in FIG. 3 and may be used when display encoder 252 uses an encoding technique that uses reference frames, such as H. 264/AVC etc. In this case, UI information 256 may be used to determine reference frame information, such as whether to save a new frame as reference frame, and whether the reference frame should be a short-term or long-term reference frame etc.

In FIG. 6, local desktop 610 represents the first GUI at client device 210, while remote desktop 620 represents the second GUI at server device 220. New Window 2 is created on local desktop 610 of client device 210. VDI Client 212 captures UI events 260 relating to the creation Window 2, such as a series of mouse movement and button pressing events. VDI host agent 250 obtains UI information 256 using API 248 according to the input events 260, such as ID, size and position of Window 2. VDI host agent 250 then compares current frame 624 with previous frame 622 to determine whether there is a frame change. According to blocks 330 and 334 in FIG. 3, since updates include new Window 2, VDI host agent 250 saves current frame 624 as a long-term reference frame.

Although not shown in FIG. 6, the content of existing Window 1 might have been updated while its position and size remain unchanged. In this case, according to blocks 340 and 342 in FIG. 3, VDI host agent 250 saves current frame 624 as a short-term reference frame.

Encoder

Figure 7:
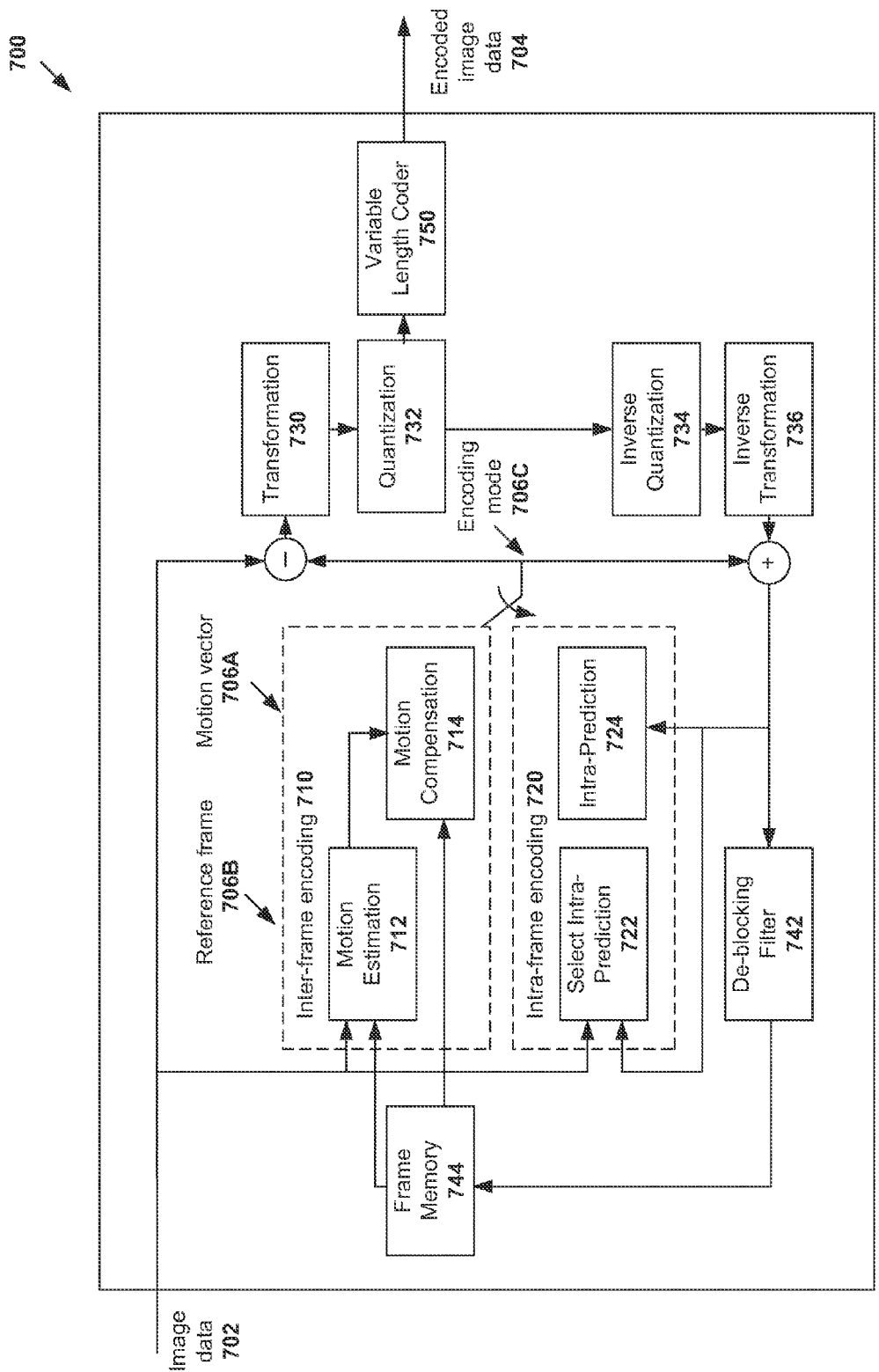
FIG. 7 is a schematic diagram of an encoder for encoding image data based on encoding configuration, in accordance with at least some embodiments of the present disclosure.

FIG. 7 is a schematic diagram of a display encoder 700, in accordance with at least some embodiments of the present disclosure. Encoder 700 is an example of display encoder 252 at VDI host agent 250 to encode image data 702 to generate encoded data image 704. Image data 702 to be encoded may be of any suitable size, such as a block, macro-block, slice, frame, etc.

Encoder 700 may include the following components: inter-frame encoding block 710 that includes motion estimation 712 and motion compensation 714; intra-frame encoding block 720 that includes select intra-prediction 722 and intra-prediction 724; transformation 730, quantization 732, inverse quantization 734 and inverse transformation 736; de-blocking filter 742, frame memory 744 and variable length coder 750. Components 330 to 346 may be implemented using any suitable software, hardware or a combination of both.

In general, intra-frame encoding 710 reduces spatial redundancies within a frame by employing transform coding while inter-frame encoding 720 takes advantage of temporal redundancies by coding the difference between a predicted frame and the current frame. Transformation 730 performs transform coding (e.g. discrete cosine transform) on the output of intra-frame encoding 710 or inter-frame encoding 720. Following transformation 730, resulting transform coefficients are quantized by quantization 732, the results of which are encoded by variable length coder 750. Inverse quantization 734 and inverse transformation 736 (e.g. inverse discrete cosine transform) may be used reconstruct reference information.

FIG. 7 shows how encoder 700 may encode image data 702 based on encoding configuration determined from UI information 256. For example, motion vector 706A and reference frame information 706B may be used in inter-frame encoding 710. Encoding mode 706C may be used to select between inter-frame encoding 710 (e.g. when an existing window is moved) and intra-frame encoding 720 (e.g. when a new window is created).

In another embodiment not shown in FIG. 7, text encoding mode may be selected if a newly created window includes a text box, for example using PCoIP encoding as discussed with reference to FIG. 5. Also, it should be understood that it is not necessary for encoder 700 to use the different types of encoding configuration 706A, 706B and 706C shown, and its implementation should depend on the encoding technique used by display encoder 252.

Computer System

Figure 8:
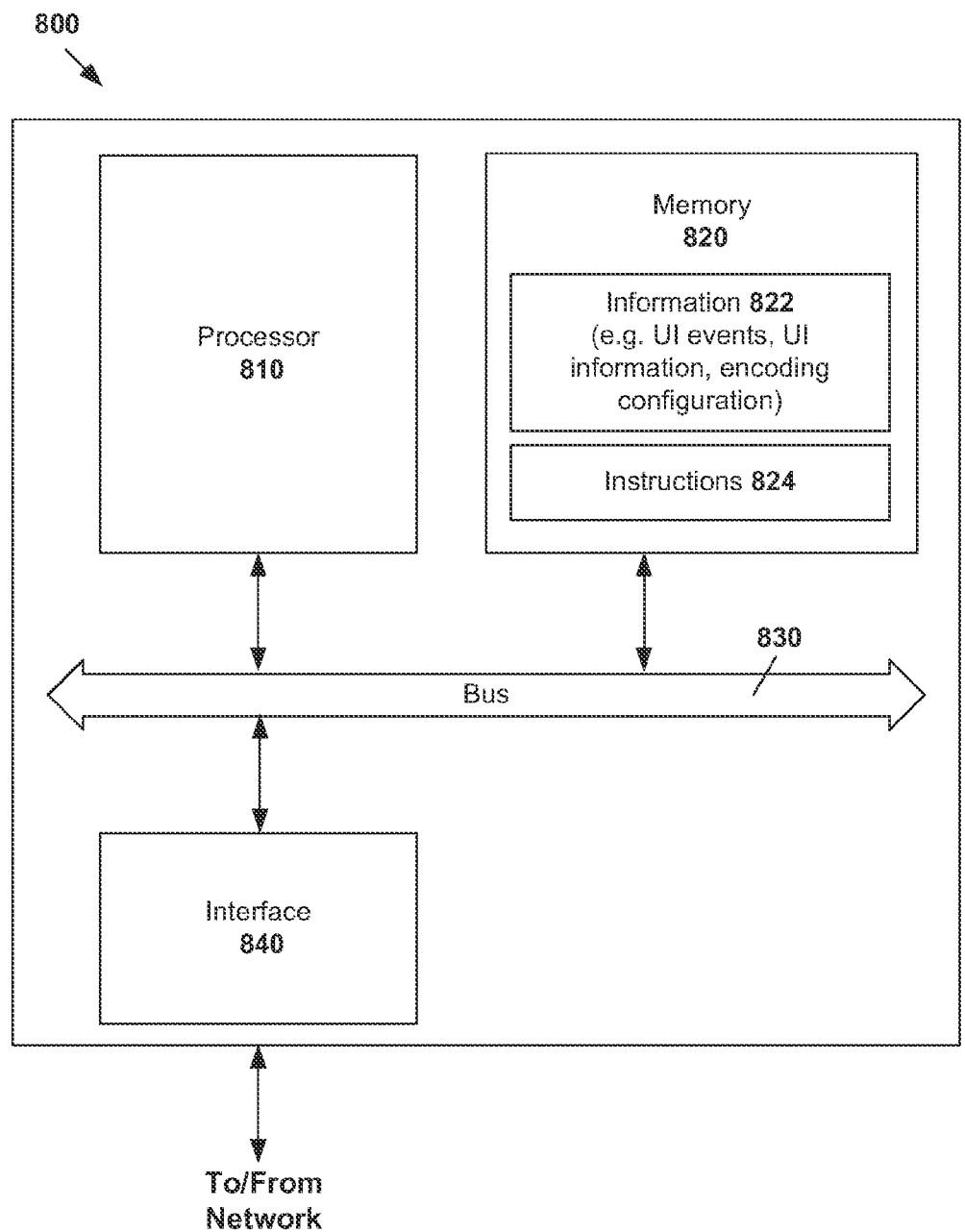
FIG. 8 is a device configured to perform enhanced image encoding in an example VDI environment, in accordance with at least some embodiments of the present disclosure.

The above examples can be implemented by hardware, software or firmware or a combination thereof. FIG. 8 is an example system configured to perform enhanced image encoding in an example VDI environment, in accordance to at least some embodiments in the present disclosure. Example system 800 may include processor 810, memory 820, network interface device 840, and bus 830 that facilitate communication among these illustrated components and other components.

Processor 810 is to perform processes described herein with reference to FIG. 1 to FIG. 7. Memory 820 may store relevant information 822 to perform enhanced image encoding in a VDI environment, such as UI information 256, encoding configuration, etc. Memory 820 may further store machine-readable instructions 824 executable by processor 810 to cause processor 810 to perform processes described herein with reference to FIG. 1 to FIG. 7.

The methods, processes and units described herein may be implemented by hardware (including hardware logic circuitry), software or firmware or a combination thereof. The term 'processor' is to be interpreted broadly to include a processing unit, ASIC, logic unit, or programmable gate array etc.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof.

Those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

Software and/or firmware to implement the techniques introduced here may be stored on a non-transitory machine-readable storage medium and may be executed by one or more general-purpose or special-purpose programmable microprocessors. A "machine-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). For example, a machine-accessible storage medium includes recordable/non recordable media (e.g., read-only memory (ROM), random access memory (RAM), magnetic disk storage media, optical storage media, flash memory devices, etc.)

The figures are only illustrations of an example, wherein the units or procedure shown in the figures are not necessarily essential for implementing the present disclosure. Those skilled in the art will understand that the units in the device in the example can be arranged in the device in the examples as described, or can be alternatively located in one or more devices different from that in the examples. The units in the examples described can be combined into one module or further divided into a plurality of sub-units.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

I claim:

1. A method for a server device to perform enhanced image encoding in a virtual desktop infrastructure (VDI) environment comprising a client device that supports a first graphical user interface (GUI) and the server device that supports a second GUI associated with the first GUI, the server device implementing an operating system that supports both an agent and an application programming interface (API), the method comprising:
   receiving, from the client device, user interface (UI) events based on which the first GUI is to be updated;
   obtaining, by the agent on the server device, UI information that includes one or more attributes of a UI element on the second GUI by invoking the API, wherein the API is invoked to obtain the UI information from the operating system, and to determine a type of update caused by the received UI events to the UI element based on the UI information;
   determining, by the agent on the server device, an encoding configuration associated with the type of update to the UI element for an encoder supported by the server device based at least in part on the UI information obtained through invocation of the API, wherein determining the encoding configuration for the encoder further includes
   in response to determination that the type of update is a creation of a new UI element or update of an existing UI element,
   setting a text encoding mode for at least some parts of the UI element in the encoding configuration when the UI information for the at least some parts of the UI element is text-based, or
   selecting one of an inter-frame encoding mode and an intra-frame encoding mode for other parts of the UI element in the encoding configuration when the UI information for the other parts of the UI element is not text-based;
   encoding, by the encoder, image data associated with the UI element on the second GUI based on the encoding configuration; and
   sending, by the server device, encoded image data to the client device to update the first GUI on a screen of the client device.

2. The method of claim 1, wherein determining the encoding configuration for the encoder comprises:
   comparing a current frame and a previous frame of the first GUI to determine a frame change; and
   determining the encoding configuration for the encoder based on the frame change and UI information.

3. The method of claim 1, wherein determining the encoding configuration for the encoder based at least in part on the UI information comprises:
   in response to determination that the type of update is a movement of the UI element from a first position to a second position on the second GUI, determining a motion vector associated with the movement of the UI element for the encoder.

4. The method of claim 1, wherein determining the encoding configuration for the encoder based at least in part on the UI information comprises:
   determining reference frame information for the encoder.

5. The method of claim 4, wherein determining the reference frame information comprises saving a current frame of the first GUI as a short-term reference frame or long-term reference frame.

6. The method of claim 1, wherein the VDI environment supports seamless window application in which virtual machine applications provided by the server device appear to operate natively on the first GUI of the client device.

7. The method of claim 1, wherein the framebuffer encoder employs one of the following encoding techniques: H.264/Advanced Video Coding (AVC), Personal Computer over Internet Protocol (PCoIP), and Portable Network Graphics (PNG).

8. The method of claim 1, wherein:
   the UI events received from the client device comprise UI input events associated with a user's interaction with the first GUI, the UI input events comprising at least one of keyboard input event, mouse input event, touch screen input event; and
   the UI information relating to the UI element on the second GUI comprises at least one of identifier, type, position, size, color, sub-element, font type, text, title, state, and shape of the UI element.

9. The method of claim 1, wherein:
   the server device is virtualized into one or more virtual machines;
   a guest operating system of one of the one or more virtual machines is configured to support a VDI host agent that receives the UI events, and determines the encoding configuration for the encoder.

10. A non-transitory computer-readable storage medium including a set of instructions which, when executed by a processor of a server device, causes the processor to perform an enhanced image encoding method in a virtual desktop infrastructure (VDI) environment comprising a client device that supports a first graphical user interface (GUI) and the server device that supports a second GUI associated with the first GUI, the server device implementing an operating system that supports both an agent and an application programming interface (API), the method comprising:
   receiving, from the client device, user interface (UI) events based on which the first GUI is to be updated;
   obtaining, by the agent on the server device, UI information that includes one or more attributes of a UI element on the second GUI by invoking the API, wherein the API is invoked to obtain the UI information from the operating system, and to determine a type of update caused by the received UI events to the UI element based on the UI information;

determining, by the agent on the server device, an encoding configuration associated with the type of update to the UI element for an encoder supported by the server device based at least in part on the UI information obtained through invocation of the API, wherein determining the encoding configuration for the encoder further includes in response to determination that the type of update is a creation of a new UI element or update of an existing UI element, setting a text encoding mode for at least some parts of the UI element in the encoding configuration when the UI information for the at least some parts of the UI element is text-based, or selecting one of an inter-frame encoding mode and an intra-frame encoding mode for other parts of the UI element in the encoding configuration when the UI information for the other parts of the UI element is not text-based;

encoding, by the encoder, image data associated with the UI element on the second GUI based on the encoding configuration; and sending, by the server device, encoded image data to the client device to update the first GUI on a screen of the client device.

11. The non-transitory computer-readable storage medium of claim 10, wherein determining the encoding configuration for the encoder comprises:

comparing a current frame and a previous frame of the first GUI to determine a frame change; and determining the encoding configuration for the encoder based on the frame change and UI information.

12. The non-transitory computer-readable storage medium of claim 10, wherein determining the encoding configuration for the encoder based at least in part on the UI information comprises:

in response to determination that the type of update is a movement of the UI element from a first position to a second position on the second GUI, determining a motion vector associated with the movement of the UI element for the encoder, the UI information includes the first position and the second position of the UI element.

13. The non-transitory computer-readable storage medium of claim 10, wherein determining the encoding configuration based at least in part on the UI information comprises:

determining reference frame information for the encoder, wherein the UI information includes one or more of the following: identifier, position and size of the UI element.

14. The non-transitory computer-readable storage medium of claim 13, wherein determining the reference frame information comprises saving a current frame of the first GUI as a short-term reference frame or long-term reference frame.

15. The non-transitory computer-readable storage medium of claim 10, wherein the VDI environment supports seamless window application in which virtual machine applications provided by the server device appear to operate natively on the first GUI of the client device.

16. The non-transitory computer-readable storage medium of claim 10, wherein the framebuffer encoder employs one of the following encoding techniques: H.264/Advanced Video Coding (AVC), Personal Computer over Internet Protocol (PCoIP), and Portable Network Graphics (PNG).

17. The non-transitory computer-readable storage medium of claim 10, wherein:

the UI events received from the client device comprise UI input events associated with a user's interaction with the first GUI, the UI input events comprising at least one of keyboard input event, mouse input event, touch screen input event; and the UI information relating to the UI element on the second GUI comprises at least one of identifier, type, position, size, color, sub-element, font type, text, title, state, and shape of the UI element.

* * * * *